United States Patent
Ben-Zvi

(10) Patent No.: US 7,472,252 B2
(45) Date of Patent: Dec. 30, 2008

(54) MERGING IDENTICAL MEMORY PAGES

(75) Inventor: Nir Ben-Zvi, Redmone, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 11/204,889

(22) Filed: Aug. 15, 2005

(65) Prior Publication Data

US 2007/0038837 A1 Feb. 15, 2007

(51) Int. Cl.
*G06F 12/00* (2006.01)
(52) U.S. Cl. .......................................... 711/203; 711/6
(58) Field of Classification Search ................. 711/6, 711/203
See application file for complete search history.

(56) References Cited

U.S. PATENT DOCUMENTS

| 6,103,226 A * | 8/2000 | Kang et al. ............. 424/93.21 |
| 2004/0098544 A1 * | 5/2004 | Gaither et al. .............. 711/154 |
| 2005/0055528 A1 * | 3/2005 | Arimilli et al. .............. 711/203 |
| 2005/0076156 A1 * | 4/2005 | Lowell .......................... 710/1 |

* cited by examiner

*Primary Examiner*—Reginald G Bragdon
*Assistant Examiner*—Aracelis Ruiz
(74) *Attorney, Agent, or Firm*—Woodcock Washburn LLP

(57) ABSTRACT

Multiple virtual addresses map to the same physical location in memory if it has been determined that they are all intended to access the same data. In one embodiment, such virtual addresses are identified, and correspondence information (such as from a translation table) is changed in order to ensure that they all correspond to the same physical location, thus freeing up memory and preventing problems such as undue swapping. A memory request servicer and translation table are used in one embodiment in order to properly respond to two requests, using different virtual addresses, both of which store identical data, by accessing the same location in physical memory. In one embodiment, code rebasing for a code page is only performed if it has not been performed before; if it has, a reference to the already rebased code page is returned. Physical memory which has more than one use (e.g. physical memory referred to by multiple virtual addresses) is designated read-only.

17 Claims, 5 Drawing Sheets

Identify virtual pages corresponding to physical storage of identical data
210

Store correspondence information denoting a correspondence between each of the virtual pages with a single physical address location storing the identical data
220

Service a memory request comprising an access request to one of the virtual address by accessing data stored single physical address location
230

MERGING IDENTICAL MEMORY PAGES

BACKGROUND

In computer systems, the memory available for use by the processor is a limited resource. Because of this limitation, instead of loading into memory every page of data required for a given program to run, pages are loaded as required. The program's "view" of memory is a logical view, in which all pages may be referenced. However, the main memory does not contain all these pages. Instead, some pages may be stored in a secondary storage, which is used to supplement the main memory. When a program requires a page which is not in the main memory, it is brought in from the secondary storage for use by the program.

When the space that page uses in main memory is needed, if the page has been changed, the changed page is written ("swapped") out to the secondary storage and the space is again available. If the page has not been changed, its physical space is just marked as available space. Generally, the translation from virtual memory space to physical memory and the loading and swapping of pages into physical memory is transparent to the program. In some cases, the program may have some knowledge of the virtual memory system in order to allow it to optimize performance.

Numerous techniques exist for loading pages into main memory, including techniques which anticipate and pre-load pages which may be used, and for swapping pages out to the secondary storage. As described, data may be stored in pages of a fixed size. Other virtual memory techniques exist, in which variable sizes of data may be allowed to be brought in and swapped out of main memory.

In some cases, when code (e.g. a binary) is loaded for use, the code page is modified. There are several common reasons why a code page is modified. For example, when code is loaded into a process with a base address different than the original base address of the code, the code needs to be adjusted ("rebased") to reflect the new base address throughout the code. By performing such rebasing, the code will function correctly in its new location, and references throughout the code to the base address or to addresses based on the base address will be correct. Some code contains a presumptive base memory address, and can run with no modifications if it is loaded into that base memory address in virtual memory. Rebasing will be necessary when the code cannot be loaded into virtual memory starting at that presumptive base memory address. Each new load location into virtual memory requires rebasing, which is processor-time intensive. Storing each new instance of the code in virtual memory also takes up virtual memory.

As described above, virtual memory techniques were created because memory is a limited resource in a computer. However, virtual memory is also in some sense a limited resource in a computer. This is because, where a number of processes are running and requiring that many pages be swapped (or where a single process requires accesses to many locations scattered among different pages, thus also requiring that many pages be swapped), then the system "thrashes." When thrashing occurs, too much of the activity of the computer system is concerned with swapping pages into and out of main memory. System performance is degraded.

While virtual memory aids with problems resulting from the limited amount of main memory, the secondary memory is also limited. This limitation is also significant—if a system requires a great deal of secondary memory, then access times for the secondary memory may be increased, and generally, costs for the system may be significant.

The problem of virtual memory thrashing and limitations of secondary memory are magnified in a time sharing environment where there are many users running processes on the same machine.

SUMMARY

In order to alleviate the problems resulting from excessive swapping, and to allow for smaller secondary memory requirements, identical code pages which have been modified can be shared between processes so that all the code pages that are identical across processes are mapped to the same physical page and on-disk image of the page. Additionally, virtual pages of any kind which store the same data can be shared by causing the same physical page to be accessed through different virtual addresses.

In one embodiment, virtual pages, either from different processes or the same processes, are examined to determine whether the virtual pages correspond to physical storage of identical data. If two or more virtual addresses are found to refer to the same stored data, each of these virtual pages is set to correspond to one single physical location in which such data is stored.

The single physical location can then be set to be read-only. In this way, if for example by one process's write command to one of the pages which corresponds to the physical location, the data in that physical location is to be changed, the data is not changed for any subsequent reference (by any of the corresponding virtual pages) to the physical location. If a write command or other command changing the contents of the data is received via a specific virtual page which is read-only, a new correspondence is made between that specific virtual page and a new physical page in memory, and the change is made and stored in the new physical location in memory corresponding to the virtual page.

In one embodiment, a translation table stores correspondences between virtual addresses used by processes and actual locations in physical memory. A memory request servicer receives memory requests (e.g. reads, writes, etc.) from processes. Where the requests include virtual addresses, the memory request servicer determines from the translation table the real address in physical memory (e.g. main memory, a cache, buffer, secondary storage or any other physical memory) and services the memory request. Where two requests include two different virtual addresses but each virtual address identifies identical data in memory, they both access the same physical memory location. In one embodiment, the memory request servicer receives write requests, locates duplicate copies of the data to be written stored in memory, and responds to the request with the location of the copy (either with a new virtual address corresponding to the physical address of the copy or with an existing virtual address corresponding to the physical address of the copy.)

In one embodiment, a translation table manager makes the determination that two virtual addresses each identify identical data in memory and makes the appropriate changes in the correspondences stored in the translation table.

In one embodiment, all requests to rebase code are handled in a unified way. When a request is received to rebase a code page, if the code page has already been rebased using a specified address, the location of the stored rebased code page is given, rather than performing the rebasing again. The requestor then uses the virtual memory address of the stored rebased code page to refer to the rebased code page. Thus only one rebasing is required. Again, the location may be designated read only in order to prevent a change for one process from affecting other processes accessing the location. While rebasing is specifically discussed as a reason for making code modifications, all code modifications are contemplated according to the invention.

In some embodiments, a count is maintained of the number of references being made to a given physical location in memory used by multiple processes (e.g. by a number of virtual addresses mapped to the physical location or a number of processes using the same virtual addresses (such as in the case of code rebased to the same address used by different processes)) and if the count is greater than one, the memory is designated read-only.

Other details and embodiments are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
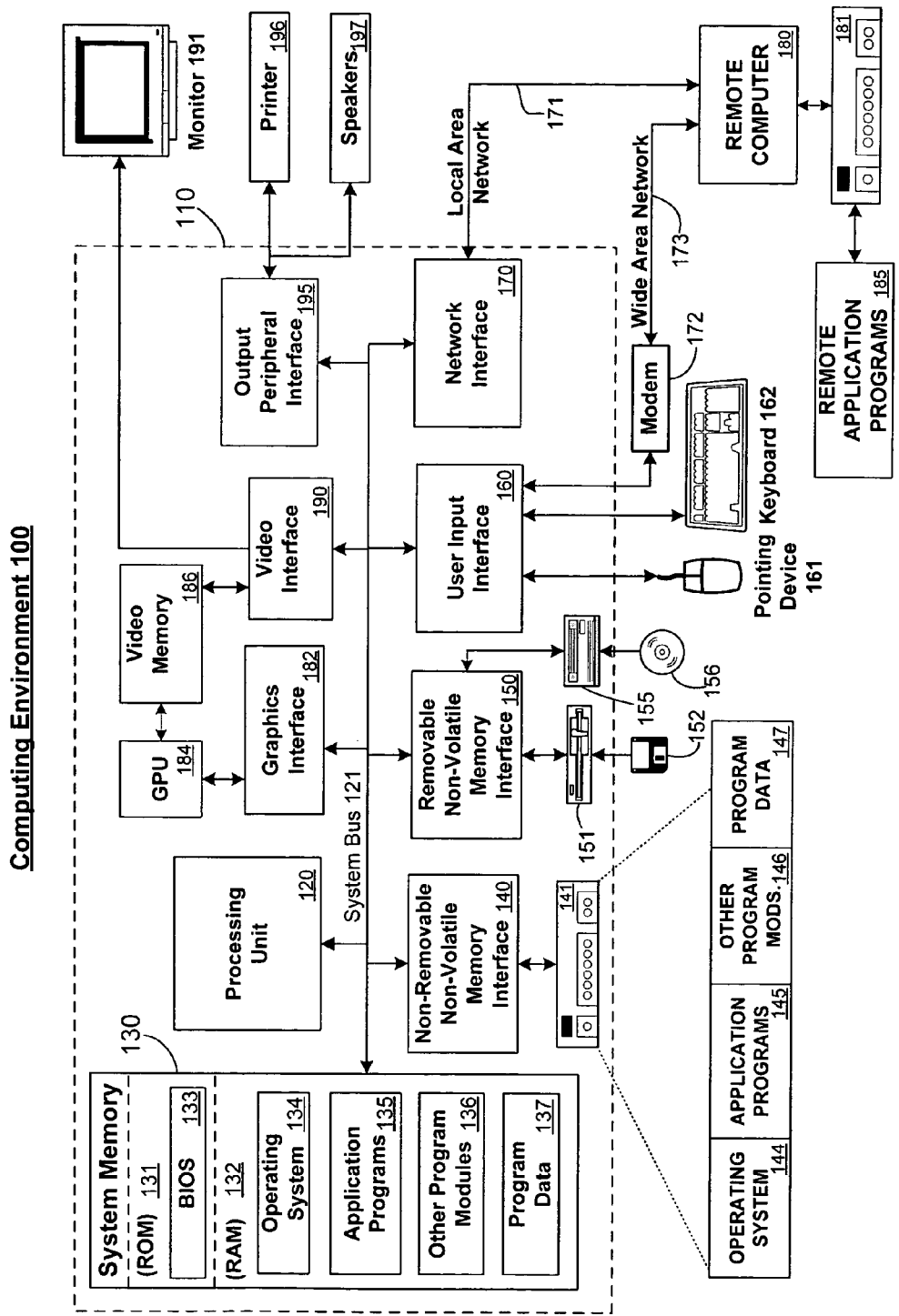
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Computing environment 100 typically includes at least some form of computer readable media. Computer readable media can be any available media that can be accessed by computing environment 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Merging Identical Memory Pages

In order to prevent virtual memory thrashing and other problems in a time sharing environment in which multiple uses of identical data may occur, identical memory pages are merged and served from one physical location in memory. The identification of identical memory pages may occur when the page is first to be written out to memory, or a continuing process may be performed which identifies already stored memory pages which are identical and merges them. (While the term "page" is used in this application, it is not intended to limit the description to any memory system or to a fixed size of memory or data.)

In some embodiments of the invention, different virtual addresses refer to the same data stored in memory. In such cases, the different virtual addresses are set to refer to the same physical memory location, which will conserve space. In some embodiments of the invention different processes may use the same virtual address to refer to the same physical memory location.

Figure 2:
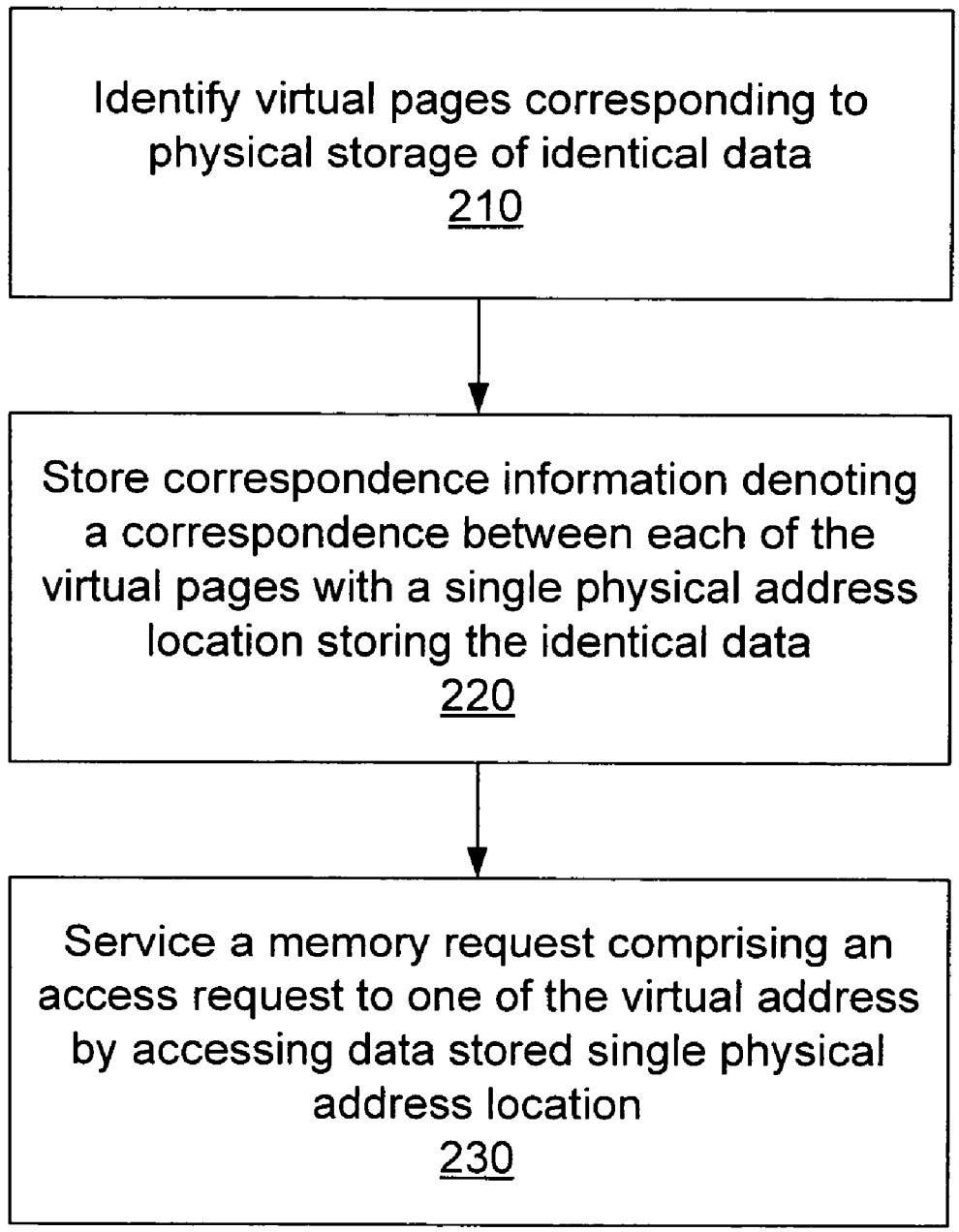
FIG. 2 is a flow diagram of a method for managing memory according to one embodiment of the invention.

FIG. 2 is a flow diagram for a method according to one embodiment of the invention, in which identical memory pages are identified and merged. As shown in FIG. 2, step 210, virtual pages corresponding to physical storage of identical data are identified. This may occur via a continuing background process or at system idle time, for example.

Such a method may use any number of methods for identifying whether identical data is stored. For example, without limitation, the identification process may examine most commonly used pages, may use hash functions to create signatures for pages and compare those signatures, or may use any other method in order to efficiently identify identical data stored in physical memory (or to identify that a page to be written physical memory as identical to an existing virtual page, in the case in which the data has not yet been written to multiple locations in physical memory but where a requested virtual page is intended to refer to data previously stored elsewhere in virtual memory.)

When different virtual addresses corresponding to physical storage of identical data have been identified, correspondence information is stored which indicates that all of the virtual addresses are to correspond with a single location in physical memory where the data is stored, just as on-disk code pages for executables for code pages that have not been modified can be used by multiple processes, in step 220. For example, if virtual address $V_a$ corresponds to physical address $P_a$ and virtual address $V_b$ corresponds to physical address $P_b$, the contents of memory at $P_a$ and $P_b$ are examined and determined to contain identical data (step 210). The correspondence is then changed in step 220, so that $V_a$ corresponds to $P_a$, but $V_b$ also corresponds to $P_a$. Location $P_b$ can then be reused. In step 230, once this correspondence has been changed, a memory request comprising an access request directed at one of the virtual addresses will be serviced by accessing the single physical memory location. So a request for reading $V_a$ or one for reading $V_b$ will be serviced by access $P_a$.

In order to prevent an access via one virtual address to change the data which is accessed when another virtual address is used, in one embodiment the physical memory location is denoted read-only.

As another example, the identification of virtual addresses which are to correspond to physical storage of identical data may be made before the storage of a second page of data. Thus, where $V_a$ corresponds to $P_a$, and a new page of data is to be written to memory in a location which is to correspond to virtual address $V_c$, the equivalence of the new page of data (not yet stored) and $P_a$ is identified (step 210) and the virtual address $V_c$ is set to correspond to $P_a$ (step 220). Then memory requests for $V_a$ or $V_c$ are both serviced via accessing $P_a$.

Shared physical address locations, according to one embodiment, are denoted read-only. According to one embodiment of the invention, if a memory request is made using a specific virtual address corresponding to the shared physical address location, and the memory request causes a change to the data stored at the shared physical address location, then a new physical address location is used to store the changed data. The correspondences are changed so that the specific virtual address now corresponds to the new physical address location.

Figure 3:
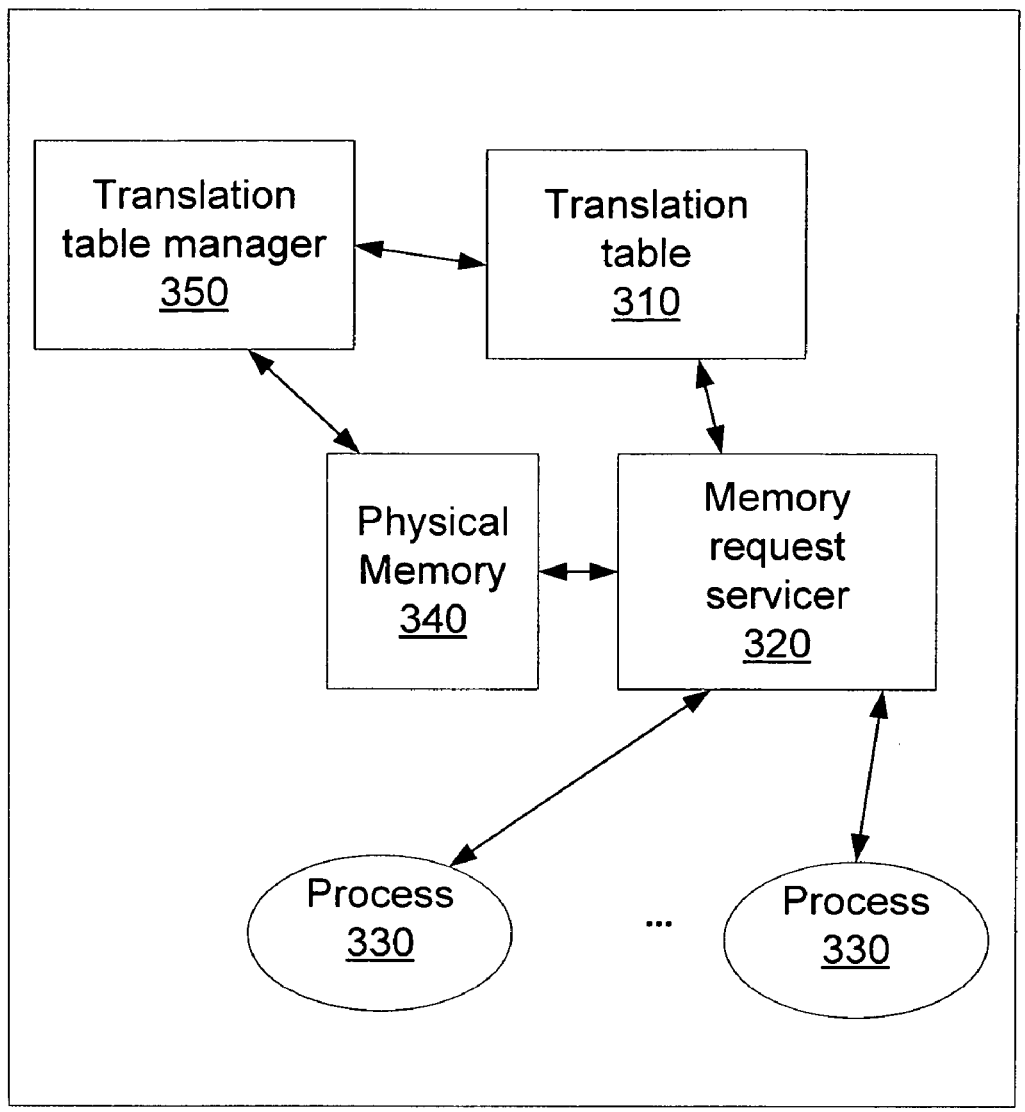
FIG. 3 is a block diagram of a memory manager system being used to manage requests from processes to obtain data stored in physical memory according to one embodiment of the invention.

FIG. 3 is a block diagram of a memory request manager system according to one embodiment of the present invention. In FIG. 3, translation table 310 contains correspondence information allowing virtual memory addresses to be translated to physical memory addresses, referring to locations in physical memory 340. Physical memory 340 may be a complex memory system and may be comprised of many parts, including buffers, caches, primary and secondary storage, etc. The memory request servicer 320 uses the translation table 310 to service physical memory requests from processes 330. While FIG. 3 shows the memory request servicer 320 arbitrating directly between processes 330 and physical memory 340, there may additionally be direct access by processes 330 to physical memory 340, and/or other components may mediate between processes 330 and physical memory 340.

Translation table 310, as noted, stores translation table information which allows translation of virtual addresses into corresponding physical addresses in physical memory 340. The memory request servicer 320 services memory requests from processes 330, and services these requests. A first memory request including a first virtual address is serviced by memory request servicer 320 by referring to translation table 310 to determine the physical address corresponding to that first virtual address. A second memory request with a second virtual address will, if the first and the second virtual address identify identical data in memory, be serviced by accessing that same physical address.

In some embodiments, memory request servicer 320 receives requests, locates duplicate copies of data stored in memory, and responds to the requests, if the copy of data has previously been stored in memory, with the location of the copy. The memory request servicer 320 may either respond to the request with an existing virtual memory address corresponding to the location of the copy or may respond with a new virtual memory address corresponding to the physical location of the copy. In these embodiments, duplications are found on-the-fly during requests.

The servicing of the write request by the memory request servicer 320 may alternately be the result of reference to the translation table 310, in which a correspondence is stored between the second virtual address and the physical address. For example, a translation table manager 350 may make the identification that two virtual addresses in translation table 310 refer to storage of identical data in physical memory 340, and may make changes in the translation table 310 to reflect this (and point both virtual addresses to the same physical memory location). The physical memory location is then set, in one embodiment, as read-only. In one embodiment, any physical memory locations no longer referred to by one of the virtual addresses is freed for use. Thus, merging identical memory pages is handled by the translation table manager 350. In another embodiment, the memory request servicer 320 performs merging of identical memory pages or otherwise enforces the accessing of one physical memory location where two different virtual memory addresses refer to storage of identical data.

Avoiding Reduplicatively Rebasing Code Pages

In one embodiment, the memory pages that are merged is rebased code pages. The identification, in this case, may occur when a request is made to rebase a code page to a specific address, and it is noted that an identical rebasing request has already been made and the result stored in physical memory. In such a case a second request to rebase a code page CP may be received, where such rebasing has already occurred to address A, and the resulting rebased code page stored. In such a case, the code page is not rebased, and instead the location of the rebased code page is used to respond to the rebasing request.

Figure 4:
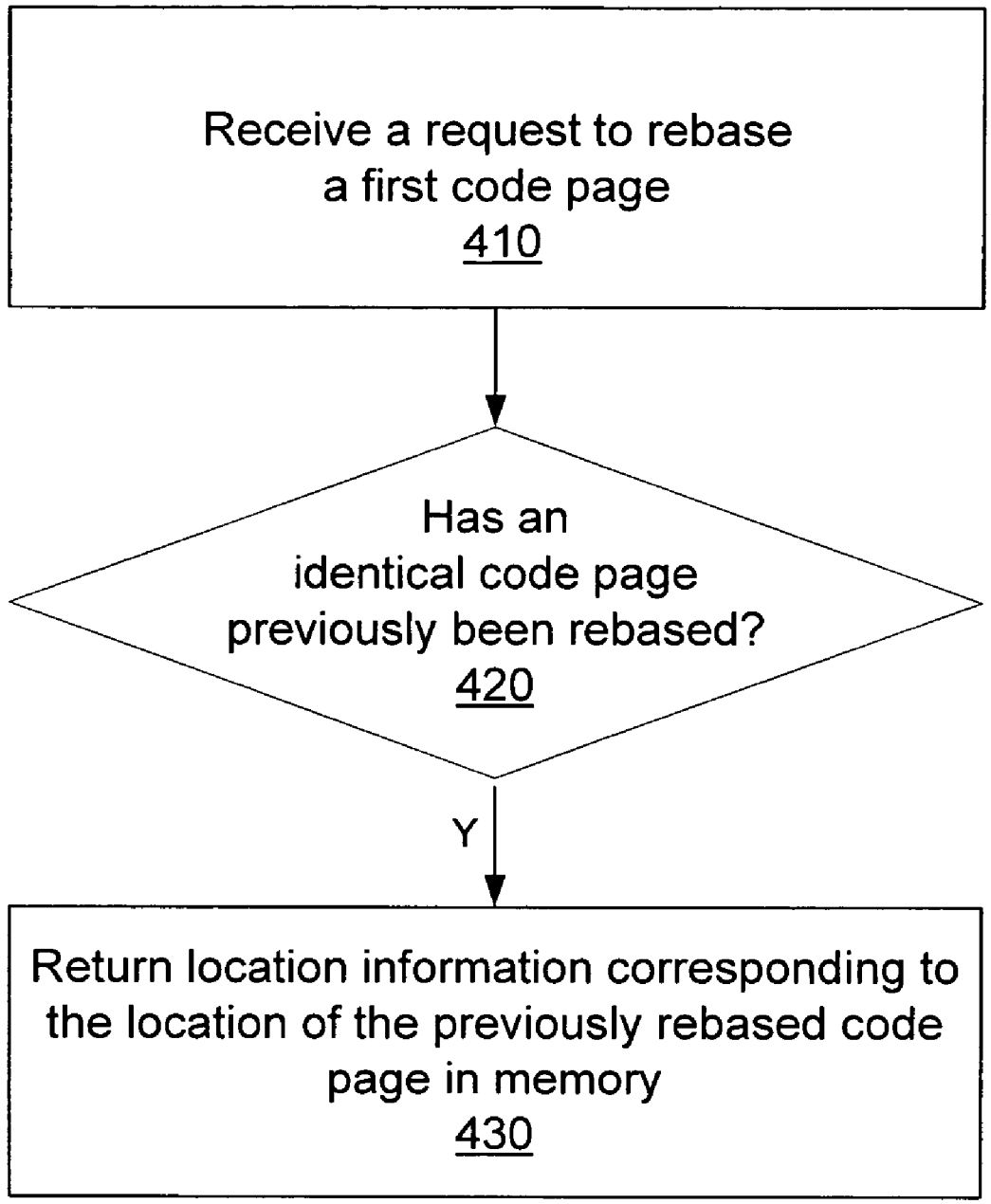
FIG. 4 is a flow diagram of a method for managing code rebasing requests according to one embodiment of the invention.

FIG. 4 is a flow diagram of a method for merging code pages in memory according to one embodiment of the invention. As shown in FIG. 4, a request is received to rebase a first code page to a specified address, in step 410. In decision step 420, it is determined whether an identical code page has previously been rebased to the same address. If so, location information corresponding to the location of the previously rebased code page in memory is returned, step 430. In this way, the rebasing of a previously rebased code page is avoided, and the memory location used to store the rebased code page can be shared. In one embodiment, the memory location is marked read-only.

Figure 5:
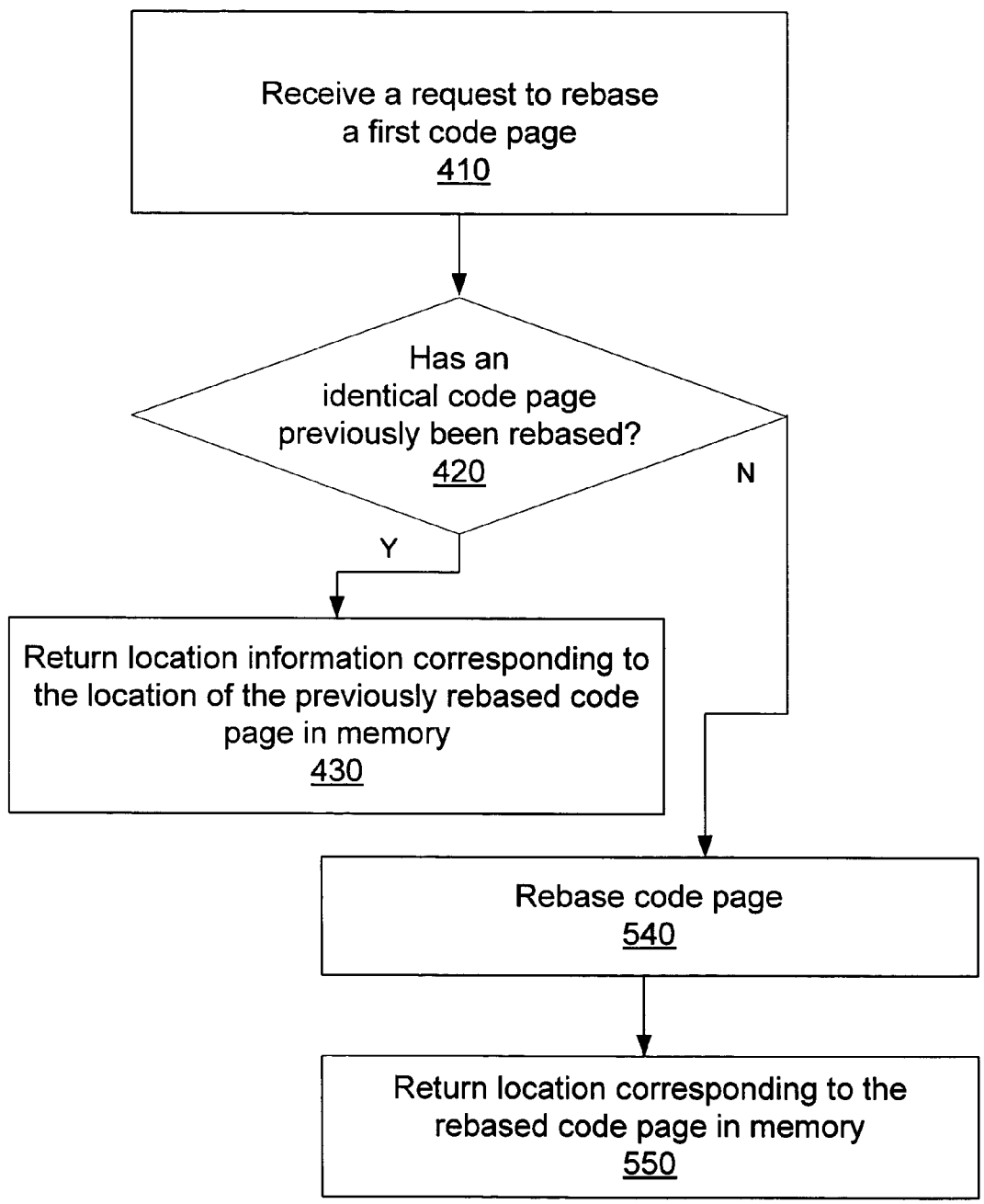
FIG. 5 is a flow diagram of a method for managing code rebasing requests according to one embodiment of the invention.

FIG. 5 shows one embodiment based on the method shown in FIG. 4. In FIG. 5, if at step 420 an identical code page was not previously rebased to the same address, the code page is rebased to the address, step 540. The location of that rebased code page in memory is then returned, step 550. Thus, the code page is rebased only if it was not previously rebased. In alternate embodiments (not shown specifically, but consistent with the method shown in FIG. 4) the code page is rebased whether or not it was previously rebased, but the rebased code page is compared to other previously rebased code pages (either directly or via a hash or signature function) and, if a previously rebased code page is found to be identical, the location of that previously rebased code page is returned.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for managing memory requests comprising:
   identifying at least two virtual pages corresponding to prospective duplicative physical storage of identical data;
   causing each of said at least two virtual pages to correspond to one shared physical page, where said shared physical page stores said identical data, thereby preventing duplicative physical storage of identical data;
   receiving a memory request comprising data comprising rebased code;
   servicing the memory request comprising an access of either one of said at least two virtual pages by accessing said shared physical page.

2. The method of claim 1, where said shared physical page is denoted read-only.

3. The method of claim 1, where, if a given memory request comprising a given virtual page from among said virtual pages causes a change to data stored at said shared physical page, a new physical page is used to store said changed data, and a correspondence for said given virtual page is made to said new physical page.

4. The method of claim 1, where said correspondences are stored in a translation table, and where said step of causing each of said at least two virtual addresses to correspond to one shared physical address location comprises modifying said translation table so that each of said virtual addresses corresponding to said shared physical address location.

5. The method of claim 1, further comprising:
   for each of said different physical pages, if said physical page no longer corresponds to any virtual page, freeing said physical page for alternate use.

6. The method of claim 1, where said step of identifying at least two virtual pages that store identical data comprises:
   identifying a corresponding physical page for each of said at least two virtual pages;
   determining if data stored at each of said corresponding physical pages is identical.

7. The method of claim 1 where said steps of identifying at least two virtual pages and causing each of said at least two virtual pages to correspond to one shared physical page are repeated periodically.

8. The method of claim 1, where said step of identifying at least two virtual pages that prospectively store identical data comprises:
   receiving a request for storing said identical data; and
   determining that said identical data has previously been stored.

9. The method of claim 8, where said step of causing each of said at least two virtual pages to correspond to one shared physical page comprises:
   responding to said request for storing said identical data with one of said virtual pages.

10. A memory request servicer system for managing memory requests, where said system comprises:
    a write memory request receiver for receiving a write memory request comprising data Comprising rebased code to be written to virtual memory;
    a duplicate locator for determining whether a copy of said data is stored in said virtual memory; and
    a write memory request servicer for, if a copy of said data is stored in said virtual memory, responding to said write memory request with a location of said copy instead of writing the data to virtual memory.

11. The system of claim 10, where said duplicate locator examines previously rebased code pages stored in said virtual memory.

12. The system of claim 10, where said write memory request servicer further, if a copy of said data is stored in said virtual memory, marks said location of said copy as read-only.

13. The system of claim 10, where said write memory request servicer further, if said duplicate locator does not determine that a copy of said data is stored in said memory, causes said data to be stored in a new location in said virtual memory, and where said write memory request servicer responds to said write memory request with said new location.

14. A computer-readable medium comprising computer-executable instructions, said computer-executable instructions for performing the steps of:
    receiving a request to rebase a first code page;
    determining if a second code page identical to said first code page has previously been rebased and stored in a location in memory;
    if a second code page identical to said first code page has previously been rebased, returning a location address, where said location address corresponds to said location in memory.

15. The computer-readable storage medium of claim 14, said steps further comprising:
    if a second code page identical to said first code page has not previously been rebased, rebasing said first code page, storing a resultant rebased code page in memory, and returning a rebased code page location address corresponding to a location of said resultant rebased code page in memory.

16. The computer-readable storage medium of claim 14, where said step of, if a second code page identical to said first code page has not previously been rebased, returning location information further comprises:

setting said location in memory to be read-only.

17. The computer-readable storage medium of claim 14, where said location address corresponds to at least one virtual addresses used to refer to said location address, where a count is maintained how many virtual addresses currently correspond to said location address, and where, if that number is greater than one, said location is set to be read-only.

* * * * *

UNITED STATES PATENT AND TRADEMARK OFFICE
CERTIFICATE OF CORRECTION

| | | |
|---|---|---|
| PATENT NO. | : 7,472,252 B2 | |
| APPLICATION NO. | : 11/204889 | |
| DATED | : December 30, 2008 | |
| INVENTOR(S) | : Nir Ben-Zvi | |

It is certified that error appears in the above-identified patent and that said Letters Patent is hereby corrected as shown below:

In column 10, line 2, in Claim 6, after "that" insert -- prospectively --.

In column 10, line 5, in Claim 6, after "data" insert -- to be --.

In column 10, line 25, in Claim 10, delete "Comprising" and insert -- comprising --, therefor.

In column 10, line 47, in Claim 14, after "readable" insert -- storage --.

In column 11, line 1, in Claim 16, after "has" delete "not".

Signed and Sealed this
Twelfth Day of July, 2011

David J. Kappos
*Director of the United States Patent and Trademark Office*